(12) United States Patent  
Mori et al.

(10) Patent No.: US 7,949,676 B2  
(45) Date of Patent: *May 24, 2011

(54) INFORMATION SEARCH SYSTEM, INFORMATION SEARCH SUPPORTING SYSTEM, AND METHOD AND PROGRAM FOR INFORMATION SEARCH

(75) Inventors: Aya Mori, Yamato (JP); Hirobumi Toyoshima, Machida (JP); Masami Tada, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 481 days.

This patent is subject to a terminal disclaimer.

(21) Appl. No.: 12/111,632

(22) Filed: Apr. 29, 2008

(65) Prior Publication Data

US 2008/0243804 A1  Oct. 2, 2008

Related U.S. Application Data

(63) Continuation of application No. 11/002,537, filed on Dec. 2, 2004, now Pat. No. 7,412,440.

(30) Foreign Application Priority Data

Dec. 5, 2003 (JP) .................................. 2003-407590

(51) Int. Cl.
  *G06F 7/00* (2006.01)
  *G06F 17/30* (2006.01)
(52) U.S. Cl. ........................................ 707/771; 707/776
(58) Field of Classification Search .................. 707/769, 707/771, 776
  See application file for complete search history.

(56) References Cited

U.S. PATENT DOCUMENTS

| 6,584,470 B2 | 6/2003 | Veal |
| 7,027,974 B1 | 4/2006 | Busch et al. |

FOREIGN PATENT DOCUMENTS

| JP | 2001243234 A | 9/2001 |
| JP | 2003-020866 A | 1/2003 |
| JP | 2003-132060 A | 5/2003 |

OTHER PUBLICATIONS

Akahani et al., "Approximate Query reformulation for Multiple Ontologies in the Semantic Web", NTT Technical Review, 2003, vol. 15 No. 3, pp. 56-58.
Nagao, "Natural Language Processing", 1996, vol. 1, pp. 200-204, 235-236.
Akahani et al., "Towards the Real-World Semantic Web-Web Search based on Spatial and Temporal Metadata", NTT Technical Review, 2003, vol. 15, No. 4, pp. 29-32.
Iljima, "The Technical Position and Assignment of Semantic Web", Journal of Japan Society of Information and Knowledge, 2002, vol. 12, No. 3, pp. 21-31.

*Primary Examiner* — Robert Timblin
*Assistant Examiner* — Mariela D Reyes
(74) *Attorney, Agent, or Firm* — Yee & Associates, P.C.; David A. Mims, Jr.

(57) ABSTRACT

Using an ontology to perform an information search utilizing a meaning given to information on a network without being required to perform complicated operations for forming an inquiry sentence in conformity with the ontology.
A pre-stage before a search engine provides an information search supporting system having a morpheme analysis section, a syntactic and semantic analysis section, and a conversion execution section which converts a natural language sentence on which syntactic analysis and semantic analysis have been performed into an inquiry sentence described in an ontology description language by referring to a case frame ontology dictionary in which are stored information indicating to which property in an ontology does the relationship among a predicate, a subject and an object in the natural language sentence correspond and the case frame of the natural language sentence in the property.

10 Claims, 5 Drawing Sheets

| PREDICATE VERB | <NOMINATIVE CASE> | <OBJECTIVE CASE> | PROPERTY |
|---|---|---|---|
| A | <BASHO (PLACE)>GA | <CHIIKI (AREA)>NI | locatedIn |
| A | <SHISETU (FACILITY)>GA | <JIKAN (TIME)>NI | openOn |
| A | <SHISETU (FACILITY)>GA | <CHIIKI (AREA)>DE | locatedIn |

CASE FRAME

INQUIRY SENTENCE

OBJECT TO BE SEARCHED: DENTAL CLINIC
OPEN DAY: SUNDAY
AREA: FUJISAWA-SHI, KANAGAWA-KEN

FIG. 7

EXAMPLE OF DEFINITION IN ONTOLOGY

```
<owl :Class rdf: ID= "OpenDay">
   <owl :intersectionOf rdf:parseType="Collection">
      <owl :Class rdfs:about = "DayInWeek"/>
      <owl :Class>
         <owl :complementOf rdf:resource= "ClosedDay"/>
      </owl :Class>
   </owl :intersectionOf>
</owl :Class>
```

FIG. 8

META DATA

```
DENTIST
FUJISAWA DENTAL CLINIC
ADDRESS: XXXX, FUJISAWA-SHI, KANAGAWA-KEN
CLOSED DAY: MONDAY
```

*FIG. 9A*

META DATA

```
DENTAL DEPARTMENT
FUJISAWA UNIVERSITY HOSPITAL
ADDRESS: YYYY, FUJISAWA-SHI, KANAGAWA-KEN
CLOSED DAY: SUNDAY
```

*FIG. 9B*

REPLY SENTENCE

```
NAME: FUJISAWA DENTAL CLINIC
ADDRESS: XXXX, FUJISAWA-SHI, KANAGAWA-KEN
CLOSED DAY: MONDAY
```

*FIG. 10*

INFORMATION SEARCH SYSTEM, INFORMATION SEARCH SUPPORTING SYSTEM, AND METHOD AND PROGRAM FOR INFORMATION SEARCH

This application is a continuation of application Ser. No. 11/002,537, filed Dec. 2, 2004, status allowed.

FIELD OF THE INVENTION

The present invention relates to an information search system and, more particularly, to an information search system in which a search for information to which a meaning is added is made by using a semantic web technique, and to a method of making such a search.

BACKGROUND ART

To obtain desired information existing on a network such as the Internet by accessing a server constructed on the network from a personal computer or a portable information terminal (hereinafter referred to simply as "information terminal"), the process of temporarily accessing a search site, which is an information search system on the network, and making a search for the information existing on the network by using the search engine is ordinarily performed. In the search site, natural language processing is ordinarily performed on information provided on the network to extract words as search keywords (hereinafter referred to simply as "keyword"), frequency information on the keywords and so on to construct a database. The search engine performs a search for information by searching the database and examining matching with an input keyword. The search engine also computes a score indicating the relation between the information found by the search in the database and the keyword by referring, for example, to the frequency information, and outputs search results ordered according to the obtained score.

Various devices have been made for search engines of this kind to perform information searches with efficiency. In recent years, information search methods utilizing an ontology used in Semantic Web techniques for handling semantics with a computer have also been proposed. The ontology is a knowledge notation method defined as a specification of a conceptualization or the like and used for semantic description of Semantic Web. On a system, it is implemented as a classification system and an inference rule set for example.

By using the ontology, a search based on a meaning can be introduced into a search in a database. That is, an information search is performed by considering a meaning attached to information on a network by means of the ontology. In this manner, the meaning of a keyword can be set as a search condition and only information in which words are used with the same meaning as that attached to the input keyword in formation containing the same words as those in the keyword can be searched for. Therefore, implementation of a method which enables a user to speedily obtain really necessary information for the user is expected.

For the conventional information search system, a method utilizing an ontology used in Semantic Web techniques has been proposed as a means for performing an information search with efficiency, as mentioned above.

However, even if a Semantic Web technique enables information on a network to have a meaning, there is a need to attach information for use of the ontology as a search condition as well as a keyword in order to search for information based on this meaning. That is, in a case where only keywords are input, only the keywords can be used as search conditions if a search is made without attaching information for use of the ontology. The search in this case is the same as ordinary search using only keywords without using the ontology.

For example, it is conceivable that in a case where a user searches for "Fujisawa de nichiyobi ni aiteiru haisha (a dental clinic open on Sunday in Fujisawa)" is searched for, he or she ordinarily inputs single words such as "haisha (dental clinic) ", "Fujisawa" and "nichiyo (Sunday)" as keywords. However, when a search is made by using only these keywords, full use of a meaning given to information on a network by Semantic Web cannot be made even if the meaning of each single word can be determined, because the relations between the single words are impaired.

On the other hand, it is necessary to describe an inquiry sentence in accordance with an ontology description language description form used on the network in order to give information for utilization of the ontology as a search condition. Thus, the user making the search is required to perform complicated operations.

Therefore, an object of the present invention is to provide a system which adds information for utilization of an ontology to search conditions without requiring a user to perform any complicated operations and thereby enables an information search making full use of meanings attached to information on a network by a Segmantic Web, and a method for such an information search.

SUMMARY OF THE INVENTION

The present invention made to achieve the above-described object can be implemented as an information search system arranged as described below. That is, this system has conversion means of inputting a natural language sentence and generating an inquiry sentence described in an ontology description language on the basis of the results of syntactic analysis and semantic analysis on the natural sentence, and information search means of performing an information search by using the inquiry sentence generated by the conversion means and by referring to an ontology corresponding to the contents described in the inquiry sentence.

More specifically, the conversion means has a morpheme analysis section, a syntactic and semantic analysis section, and a conversion execution section which converts the natural language sentence processed by the syntactic and semantic analysis section into the inquiry sentence described in the ontology description language to be delivered to a search engine by referring to a case frame ontology dictionary in which are stored information indicating to which property in the ontology does the relationship among a predicate, a nominative case and an objective case in the natural language sentence correspond and the case frame of the natural language sentence in the property. The word corresponding to the nominative case is a subject, and the word corresponding to the objective case is an object. A property in the ontology can be determined when the three words, a complete set of a predicate, a nominative case and an objective case exists.

Further preferably, if the natural language sentence to be processed can be decomposed according to the dependence relationships between the single words based on the case frame defined in correspondence with the ontology, the syntactic and semantic analysis section decomposes the natural language sentence. Alternatively, if the natural language sentence to be processed can be decomposed on the basis of the relationship among a predicate included in the natural language sentence, a nominative case related to the predicate, and an objective case which is a word acting on the nominative case, the syntactic and semantic analysis section decomposes the natural language sentence.

Also, the conversion execution section generates the inquiry sentence by examining, on the basis of the case flame ontology dictionary, the property to which the predicate of the natural language sentence processed by the syntactic and semantic analysis section corresponds and the case frame to which the natural language sentence corresponds, and by describing the obtained property and case frame in the ontology description language.

In the system of the present invention, the conversion means may be arranged to further have a storage device in which an ontology definition set is stored and an ontology processor which accesses the storage device and searches for the definition in the ontology corresponding to the structure of the natural language sentence. The conversion execution section generates the inquiry sentence by calling up the ontology processor and referring to the definitions in the ontology related to the words included in the natural language sentence processed by the analysis processing.

More preferably, the information search means of the information search system of the present invention performs an information search by referring to the ontology relating to the description of the inquiry sentence generated by the conversion means and using as a search condition semantic information described according to the ontology.

In another aspect, the present invention made to achieve the above-described object can be implemented as an inquiry sentence generation method for information search using a computer described below. This inquiry sentence generation method includes a first step of performing morpheme analysis, a second step of performing syntactic analysis and semantic analysis, and a third step of converting a natural language sentence after the analysis processing into an inquiry sentence described in an ontology description language by referring to a case frame ontology dictionary in which are stored information indicating to which property in an ontology does the relationship among a predicate and two cases (nominative and objective cases) in the natural language sentence correspond and the case frame of the natural language sentence in the property.

In still another aspect, the present invention can be implemented as an information search method using a computer, as described below. This information search method includes a step of examining a property to which a predicate of an input sentence corresponds and a case frame to which the input sentence corresponds, on the basis of a case frame ontology dictionary in which are stored information indicating to which property in an ontology does the relationship among a predicate and two cases in a natural language sentence correspond and the case frame of the natural language sentence in the property, a step of generating an inquiry sentence by describing the obtained property and case frame in an ontology description language, and a step of performing an information search by using the generated inquiry sentence.

Further, the present invention can be implemented as a program for enabling a computer to perform the functions of the above-described information search system, or a program for enabling a computer to execute processings corresponding to the steps of the above-described inquiry sentence generation method or the information search method. The present invention can also be implemented as a data structure in which, with respect to each of predicates in a natural language, a property in an ontology corresponding to the predicate, one word existing as a nominative case related to the predicate, and another word acting on the nominative case according to the property are associated with each other.

These programs and data can be provided by being distributed in a state of being stored on a magnetic disk, optical disk, a semiconductor memory or any other recording medium or by being transmitted via a network.

According to the present invention arranged as described above, an information search is performed by automatically converting an input sentence described in a natural language into an inquiry sentence in an ontology description language and by referring to an ontology having contents described in the inquiry sentence. In this manner, an information search can be performed by making full use of a meaning attached to information on a network by Semantic Wave without requiring a user to perform complicated operations.

DETAILED DESCRIPTION

The present invention will be described in detail with respect to a best mode of implementation of the present invention (hereinafter referred to as "embodiment") with reference to the accompanying drawings.

The outline of the present invention will first be described. In the present invention, a natural language sentence is input as a search condition for an information search and is analyzed to be converted into an inquiry sentence in an ontology description language. The inquiry sentence formed in the ontology description language is delivered to a search engine compatible with Semantic Web based on the ontology to perform the search, thus realizing the information search using the ontology. This embodiment will be described with respect to a case where OWL (Web Ontology Language) is used as an ontology description language and a Japanese sentence is used as a natural language.

Figure 1:
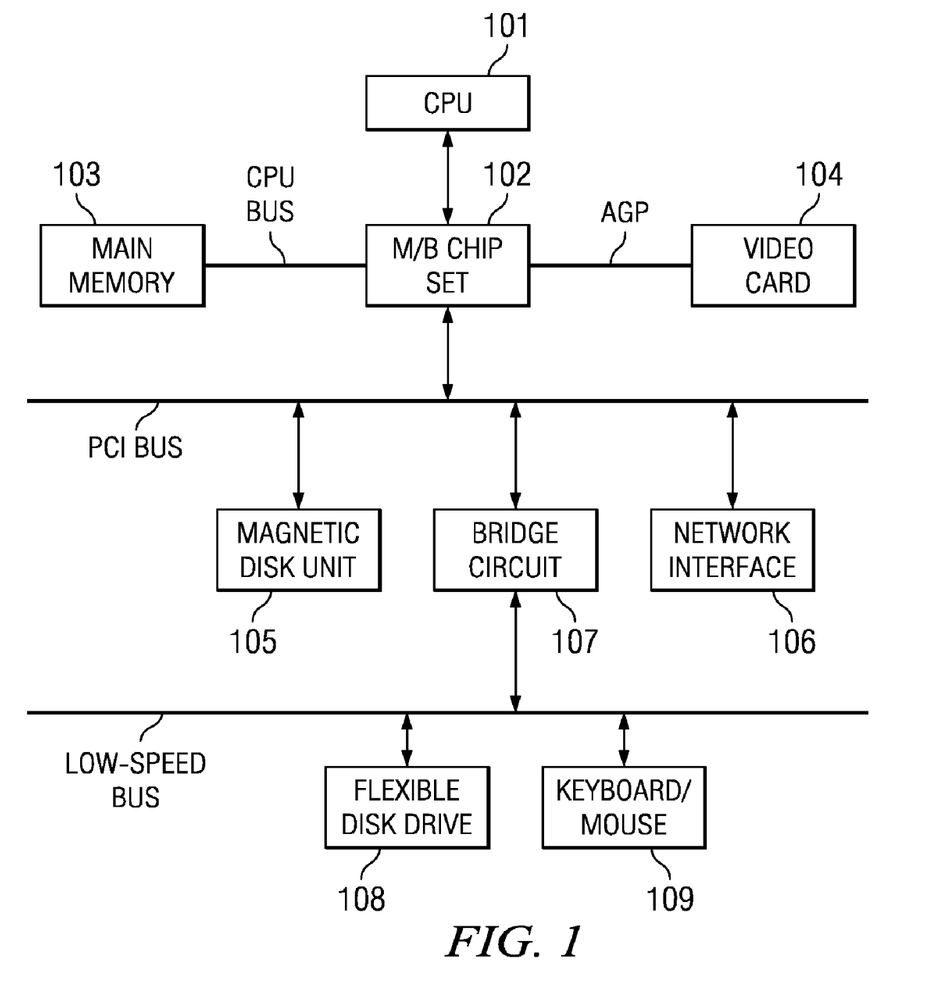
FIG. 1 is a diagram schematically showing an example of a hardware configuration of a computer suitable for implementation of an information search supporting system in the embodiment.

FIG. 1 is a diagram schematically showing an example of a hardware configuration of a computer suitable for implementation of an information search supporting system in this embodiment.

The computer shown in FIG. 1 has a CPU (central processing unit) 101, which is a computation means, a main memory 103 connected to the CPU 101 via an M/B (motherboard) chip set 102 and a CPU bus, a video card also connected to the CPU 101 via the M/B chip set 102 and an AGP (accelerated Graphics Port), a magnetic disk unit (HDD) 105 and a network interface 106 connected to the M/B chip set 102 via a PCI (Peripheral Component Interconnect) bus, and a flexible disk drive 108 and a keyboard/mouse 109 connected to the M/B chip set 102 via the PCI bus, a bridge circuit 107 and a low-speed bus such as an ISA (Industry Standard Architecture) bus.

FIG. 1 shows only an example of a hardware configuration of a computer for implementation of this embodiment, and other various configurations can be adopted if this embodiment is applicable to them. For example, a configuration may be adopted in which only a video memory is incorporated instead of the video card 104 and the CPU 101 processes image data. Also, a CD-R (compact disk recordable) drive or a DVD-RAM (digital versatile disc random access memory) drive connected via an interface such as ATA (AT attachment) or SCSI (small computer system interface) may be provided as an external storage device.

Figure 2:
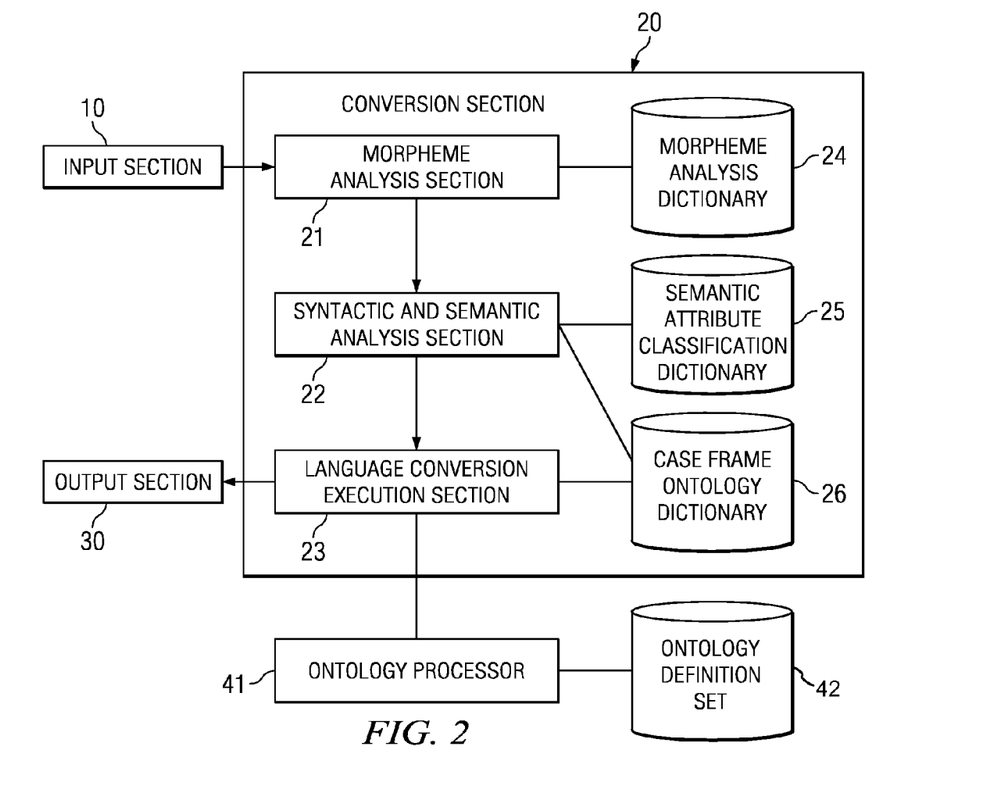
FIG. 2 is a diagram showing the functional configuration of the information search supporting system in the embodiment.

FIG. 2 is a diagram showing the functional configuration of the information search supporting system in this embodiment.

Referring to FIG. 2, the information search supporting system has an input section 10 to which a natural language sentence in which a search condition is described is input, a conversion section 20 in which the input natural language sentence is converted into an inquiry sentence formed by describing the input natural language sentence in OWL, and an output section 30 through which the inquiry sentence formed in the conversion section 20 is output to a search engine. In this configuration, the input section 10 is realized, for example, as the keyboard/mouse 109 shown in FIG. 1. In a case where the information search supporting system of this embodiment is used from an external terminal device through a network, the input section 10 is realized as the network interface 106 shown in FIG. 1. The conversion section 20 is realized as the program-controlled CPU 101, the main memory 103 and the storage device, e.g., the magnetic storage device 105 shown in FIG. 1. The output section 30 is realized as an interface with a search engine. For example, in a case where an external search engine (e.g., a search site) is used to perform a search, the output section 30 is realized as the network interface 106 shown in FIG. 1.

The conversion section 20 in which conversion of a natural language sentence into an inquiry sentence in OWL according to this embodiment is performed has, as shown in FIG. 2, a morpheme analysis section 21, a syntactic and semantic analysis section 22, a language conversion execution section 23, a morpheme analysis dictionary 24, a semantic attribute classification dictionary 25, and a case frame ontology dictionary 26. The morpheme analysis section 21, the syntactic and semantic analysis section 22 and the language conversion execution section 23 are realized, for example, as the program-controlled CPU 101 and the main memory 103 shown in FIG. 1. A memory analysis dictionary 24, a semantic attribute classification dictionary 25, and a case frame ontology dictionary 26 are realized, for example, as the magnetic disk device 105 shown in FIG. 1.

A method called a case frame is known as a method of classifying words semantically and describing the dependence relationship between the words in natural language processing. For example, the case frame of a verb "aru (be)" (which means "exist") can be expressed as "(shisetu) ga (chiiki) ni ((a facility) in (an area))". A property in OWL of the ontology description language defines the relationship between classes and is considered to correspond to a predicate verb which is the relationship between a nominative case and an objective case in a natural language. That is, if shisetu (facility) exists as a nominative case while chiiki (area) exists as an objective case, the verb "aru (be)" can be associated with a property locatedIn. Thus, a case frame and an ontology can be simultaneously described. In this embodiment, the case frame ontology dictionary 26 in which such association is described is introduced and used in semantic analysis of input sentences. Case frames defined according to an ontology described in the case frame ontology dictionary 26 are limited to two cases: nominative and objective cases unlike ordinary case frames, as described below in detail. Also, since a verb is a property between two items in the vocabulary, the case frame ontology dictionary 26 can be provided as one notation of the Japanese language ontology. For example, a sentence:

"A-Shika wa Fujisawa ni aru (there is a dental service-A in Fujisawa)" can be expressed in OWL, as shown below.

```
<owl:Thing rdf:ID="A-Shika">
    <locatedIn rdf:resource="Fujisawa"/>
</owl:Thing>
```

From syntactic and semantic analysis described below, it is determined that "A-Shika" denotes a facility and "Fujisawa" (representing Fujisawa-shi in Kanagawa prefecture) denotes an area, and this analysis result is described in OWL.

The morpheme analysis section 21 executes morpheme analysis processing on an input natural language sentence (hereinafter referred to as "input sentence") by referring to the morpheme analysis dictionary 24. In morpheme analysis processing, an input sentence is divided into minimum unit letter strings (morphemes) each having a meaning. For example, An input sentence "Fujisawa de nichiyobi ni aiteiru haisha (A dental clinic open on Sunday in Fujisawa)" is divided into morphemes:
"Fujisawa", "de", "nichiyobi", "ni", "ai", "te", "i", "ru", "haisha".

In this embodiment, an existing morpheme analysis processing technique such as machine translation used in ordinary natural language processing can be used.

The syntactic and semantic analysis section 22 executes syntactic and semantic analysis processing on the input sentence processed by analysis processing in the morpheme analysis section 21 by referring to the semantic attribute classification dictionary 25 and the case frame ontology dictionary 26. In this embodiment, it is possible to decompose a sentence having a complicated modification and connection structure into a plurality of sentences of simpler structure in conformity with the ontology by referring to the case flame ontology dictionary 26 as well as to perform ordinary syntactic analysis, i.e., analysis of the modification/connection relationships between clauses (the relationship between a subject and a predicate and the relationship between a modifier and a modificand).

For extraction of a keyword for a search from a natural language sentence, finding the theme of the sentence is important. Portions other than the theme of the sentence are considered to be words modifying the keyword and to be limiting conditions for determining the keyword. From this viewpoint, semantic analysis of the input sentence is performed on the basis of the modification/connection relationships obtained by the syntactic analysis. The input sentence is divided into a plurality of sentences if possible.

The semantic attribute classification dictionary 25 shows to which category in a semantic primitive system a word belongs. As a semantic attribute system, a well-known one described in "Nihongo Goi Taikei" from Iwanami Shoten for example may be used. However, a unique word category classification or the like may be performed. For example, a dictionary entry in the semantic attribute classification dictionary 25 is expressed as follows.

Haisha (dentist, dental clinic): person, facility

This expression shows that the word "haisha" exists in two categories "person" and "facility" since it denotes a doctor (person) who treats teeth in one case and also denotes a dental clinic (facility) in another case.

The case frame ontology dictionary 26 shows to which property in the ontology the relationship between a predicate and words for two cases (nominative and objective cases) relates. In processing in the syntactic and semantic analysis section 22, however, the case frame ontology dictionary 26 is mainly used as a case frame dictionary.

Figure 3:
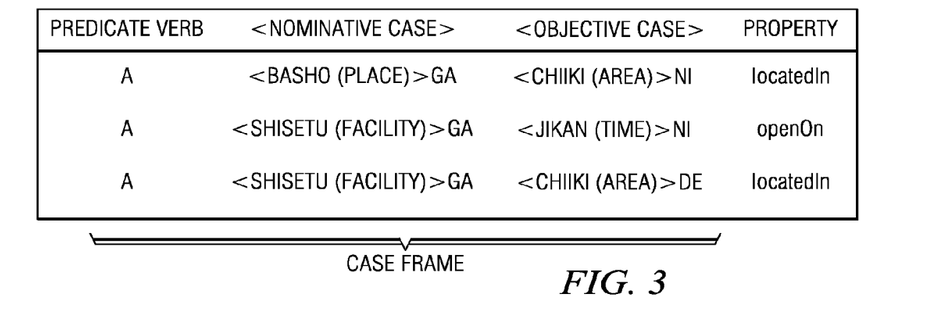
FIG. 3 is a diagram showing an example of the construction of the case frame ontology dictionary used in the embodiment.

FIG. 3 is a diagram showing an example of the construction of the case frame ontology dictionary 26.

Referring to FIG. 3, nominative and objective cases of each of natural language sentences in which predicate verbs in are used and properties of the ontology are stored in the case frame ontology dictionary 26 by being associated with each other. In these contents, the relationship among the predicate verb, the nominative case and the objective case represents a case frame. Objective cases in the case frame ontology dictionary 26 are any words each acting on the nominative case (the subject in a sentence) in some way and broadly defined in comparison with objective cases in ordinary grammatical terms, and include times and regions (classified as a time case or a location case or the like in the grammar of natural language processing), as shown in the figure. A predicate verb related to a plurality of case frames is registered with respect to each case frame.

Referring to FIG. 3, the predicate verb "a (open)" for example is entered in the case frame ontology dictionary 26 as shown below.

"a": <shisetu (facility)>ga<jikan (time)>ni openOn

This case frame is used, for example, in the illustrative sentence "nichiyobi ni aiteiru haisha (dental clinic open on Sunday)". In this sentence, "nichiyobi" denotes a time and "haisha" denotes a facility. The verb "aiteiru (open)" is in a participial adjective form. Therefore, haisha, which is essentially a nominative case, is a modificand. "a" is also entered as shown below.

"a": <shisetu (facility)>ga<chiiki (area)>de locatedIn

This case frame is used, for example, in the illustrative sentence "Fujisawa de aiteiru haisha (dental clinic open in Fujisawa)". In this sentence, "Fujisawa" represents an area. "Haisha" and "aiteiru" are the same as described above.

While a number of cases according to the structure of a sentence is related to a predicate verb in the ordinary syntactic analysis, a plurality of sentences can be generated with respect to one verb (that is, an original sentence can be decomposed into a plurality of sentences) by referring to the semantic attribute classification dictionary 25 and the case frame ontology dictionary 26 formed as described above, thus enabling expression of multiplex characteristics of words and phrases of the natural language.

Figure 4:
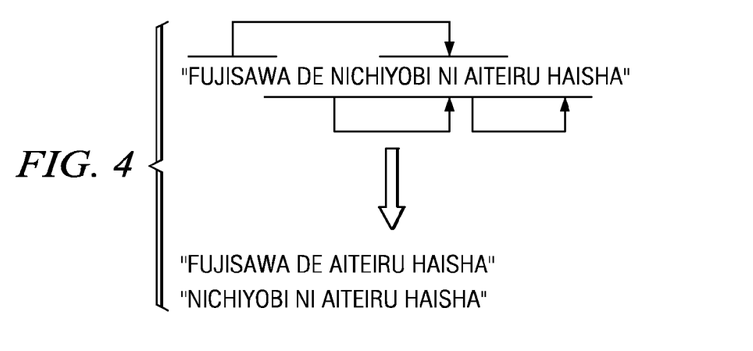
FIG. 4 is a diagram showing syntactic and semantic analysis performed by the syntactic and semantic analysis section in the embodiment.

FIG. 4 is a diagram showing syntactic and semantic analysis performed by the syntactic and semantic analysis section 22 in this embodiment.

As shown in FIG. 4, when the modification/connection relationship in the sentence "Fujisawa de nichiyobi ni aiteiru haisha (dental clinic open on Sunday in Fujisawa)" is analyzed, it can be understood from the analysis results that "aiteiru" constitutes one sentence while having two meanings:

"Fujisawa de aiteiru (open in Fujisawa)", and

"nichiyobi ni aiteiru (open on Sunday)".

That is, the verb "a (open)" is used in a pattern "<shisetu (facility)>wa<chiiki (area)>de a" and a pattern "<shisetu (facility)>wa<jikan (time)>ni a". Accordingly, the syntactic and semantic analysis section 22 in this embodiment applies the sentence "Fujisawa de nichiyobi ni aiteiru haisha" to the case frame in the above-described case frame ontology dictionary 26, decomposes the sentence into "Fujisawa de aiteiru", and "nichiyobi ni aiteiru", and ascertains that "aiteiru" in "Fujisawa de aiteiru" is used as a meaning (property) locatedIn and "aiteiru" in "nichiyobi ni aiteiru" is used as a meaning (property) openOn.

In the sentence "Fujisawa de aiteiru haisha" ending at a substantiative, a participial adjective form of the verb "aiteiru" accompanied with the objective case modifies the nominative case. This sentence can be considered a modification of the sentence "haisha ga Fujisawa de aiteiru (a dental clinic is open in Fujisawa)", and can be applied to the case frame ontology dictionary 26 as well as the sentence "haisha ga Fujisawa de aiteiru" in conformity with the entry in the case frame ontology dictionary 26.

The language conversion execution section 23 executes conversion processing for converting the input sentence processed by analysis processing in the syntactic and semantic analysis section 22 into an inquiry sentence in OWL by referring to the case frame ontology dictionary 26. A natural language sentence can be considered to be constituted by a keyword corresponding to a theme and modifiers corresponding to limiting conditions for the keyword, as described above. Therefore, an inquiry sentence can be generated by describing in OWL the modification/connection relationship between the words indicated by a case frame obtained as an analysis result by the syntactic and semantic analysis section 22. Also, a property in the ontology corresponding to the predicate verb is obtained by referring to the case frame ontology dictionary 26, and is described in the inquiry sentence. From the sentences shown in the analysis example in FIG. 3, properties locatedIn and openOn are obtained to be described in the inquiry sentence.

At the time of generation of an inquiry sentence, the language conversion execution section 23 can refer to ontology definitions with respect to the words and properties described in the inquiry sentence by calling up an ontology processor 41. The ontology processor 41 is a processor which accesses a storage means in which an ontology definition set 42 is stored to examine how the ontology is defined with respect to particular words. It is possible to easily obtain OWL descriptions for the relationships between the words constituting the input sentence by referring to the ontology definitions with the ontology processor 41. The ontology processor 41 and the storage means in which ontology definitions are stored can be included in the configuration of the information search supporting system in this embodiment. Alternatively, an external ontology server may be used.

Figure 5:
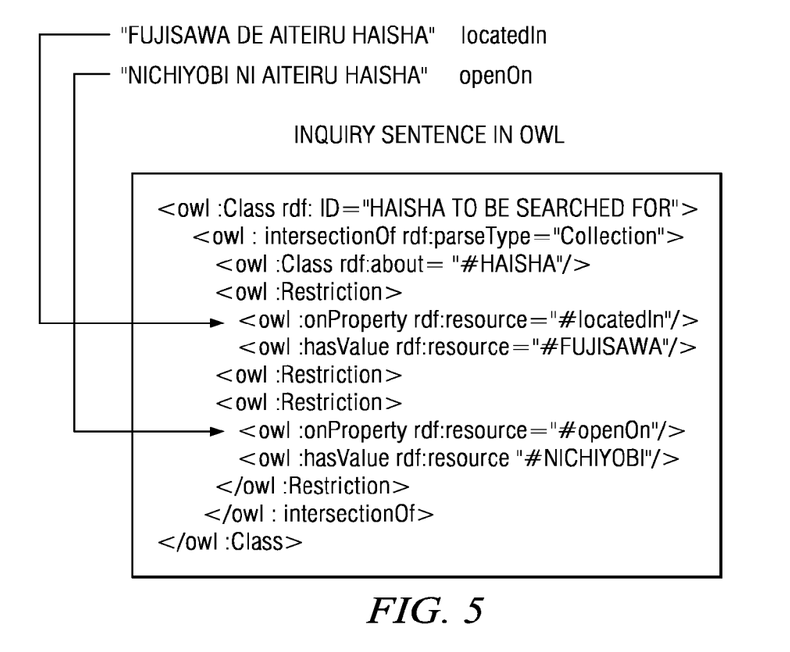
FIG. 5 is a diagram showing an example of an inquiry sentence in OWL generated with respect to an input sentence "Fujisawa de nichiyobi ni aiteiru haisha (a dental clinic open on Sunday in Fujisawa)" in the embodiment.

FIG. 5 is a diagram showing an example of an inquiry sentence in OWL generated with respect to the input sentence "Fujisawa de nichiyobi ni aiteiru haisha (a dental clinic open on Sunday in Fujisawa)".

As shown in FIG. 5, the inquiry sentence includes the keyword "haisha (dentist, dental clinic)", descriptions of "Fujisawa" and a property locatedIn corresponding to "Fujisawa de aiteiru (open in Fujisawa)" modifying "haisha", and descriptions of "Nichiyobi (Sunday)" and a property openOn corresponding to "nichiyobi ni aiteiru (open on Sunday)".

The inquiry sentence in OWL (ontology description language) generated from the natural language sentence (input sentence) as described above is sent to a search engine compatible with Semantic Web via the output section 30, and an information search is made by the search engine considering the meaning.

When a user inputs search conditions by using a natural language sentence, one of other various expressions, e.g., "nichiyobi ni Fujisawa de yatteiru haisha (a dentist working on Sunday in Fujisawa)",
"Fujisawa de nichiyobi ni yatteiru haishasan (a dentist working in Fujisawa on Sunday)",
"Fujisawa ni sonzaishi nichiyobi ni shinryoshiteiru haishasan (a dental clinic existing in Fujisawa and offering diagnostic and treatment service on Sunday)", and
"Fujisawa ni ari nichiyobi ni aiteini haishasan (a dental clinic located in Fujisawa and open on Sunday" may be input instead of the above-described "haisha open on Sunday in Fujisawa" as a sentence having the same contents as the sentence "haisha open on Sunday in Fujisawa".

In this embodiment, morpheme analysis and syntactic and semantic analysis in conformity with ontology properties are performed to recognize that these sentences have the same meaning. That is, in the case frame ontology dictionary 26, if the properties openOn and locatedIn are registered with respect to predicate verbs "working" and "offering diagnostic service" such as those shown above as well as to "open", each of these sentences can be converted into the inquiry sentence in OWL shown in FIG. 5. Thus, the user can input, as the above-described input sentence, to an information search system to which this embodiment is applied, any natural language sentence including a search condition according to his/her preference.

Figure 6:
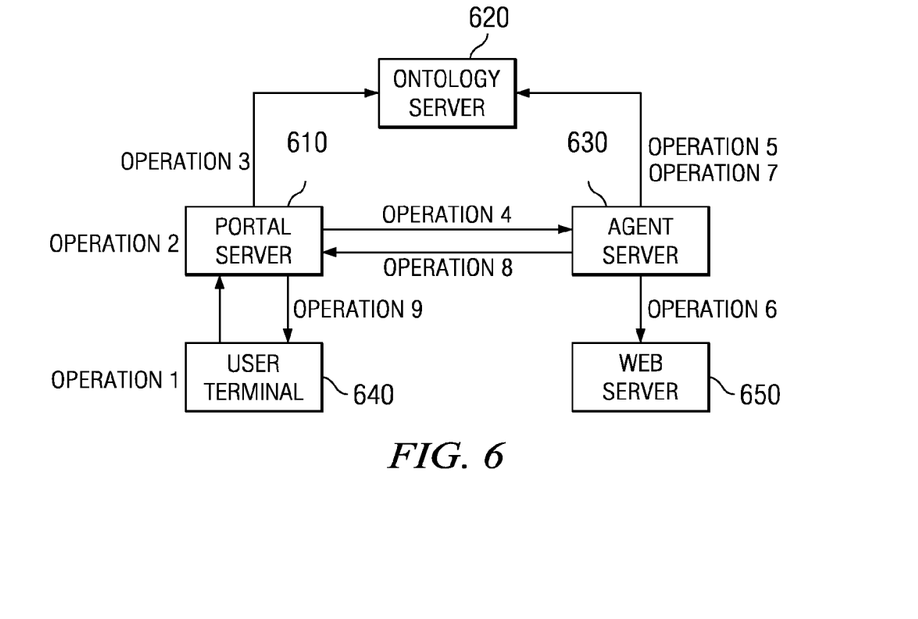
FIG. 6 is a diagram showing an example of a configuration of an information search system using the information search supporting system in the embodiment.

FIG. 6 shows an example of a configuration of an information search system using the information search supporting system in this embodiment.

The information search system shown in FIG. 6 includes a portal server 610, an ontology server 620 and an agent server 630, which are connected via a network. The portal server 610 corresponds to the information search supporting system in this embodiment. The portal server 610 receives a natural language sentence by accepting access from a user terminal 640, converts the natural language sentence into an inquiry sentence in OWL, and delivers the inquiry sentence to the agent server 630. The ontology server 620 has the ontology processor 41 and the storage device in which an ontology definition set is stored, searches for an ontology definition according to inquiries from the portal server 610 and the agent server 630, and sends back the ontology definition to the portal server 610. The agent server 630 has a search engine compatible with Semantic Web and accesses an Web server 650 compatible with Semantic Web on the network to execute an information search considering the meaning.

Figure 7:
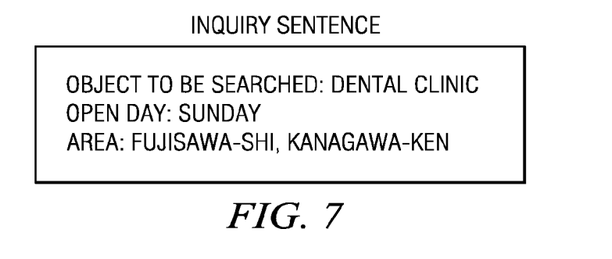
FIG. 7 is a diagram showing the contents of an inquiry sentence generated in the embodiment.

When a user who wishes to perform an information search inputs a natural language sentence "Fujisawa de nichiyobi ni aiteiru haisha (a dental clinic open on Sunday in Fujisawa)" by using the user terminal 640 (operation 1) to the information search system in FIG. 6, the input sentence is input to the portal server 610 and morpheme analysis and syntactic and semantic analysis are performed (operation 2). On the basis of the results of these analyses, the ontology definitions are referred to through the ontology server 62 (operation 3). The ontology relating to various words and properties is stored in the storage device of the ontology server 620 and can be used for conversion of the input sentence into an inquiry sentence in OWL. The portal server 610 generates an inquiry sentence described in OWL and having contents shown in FIG. 7 on the basis of the analysis results and the ontology definitions referred to, and delivers the inquiry sentence to the agent server 630 (operation 4).

Figure 8:
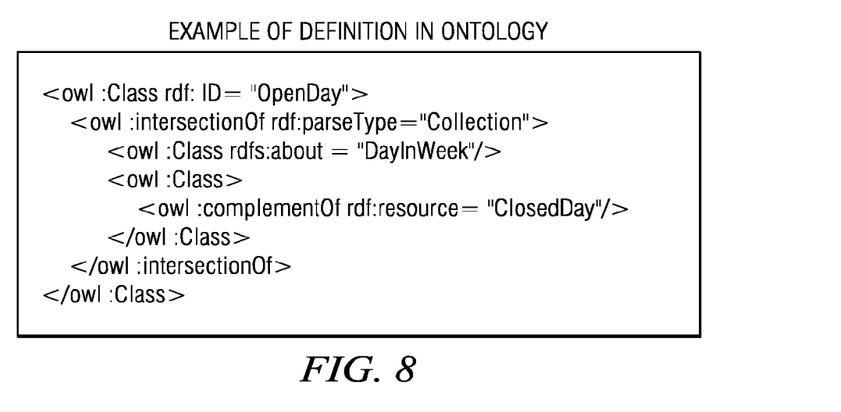
FIG. 8 is a diagram showing an example of an ontology definition used in the embodiment.

The agent server 630 receiving the inquiry sentence from the portal server 610 accesses the ontology server 620 to obtain the ontology definition with respect to the inquiry sentence (operation 5), and executes an information search in the Web server 650 by suitably considering the obtained information (operation 6). For example, an ontology definition such as shown in FIG. 8 is stored in the storage means in the ontology server 620 with respect to open days. By referring to this, the agent server 630 can search for information about the words and properties described in the inquiry sentence.

Figure 9A:
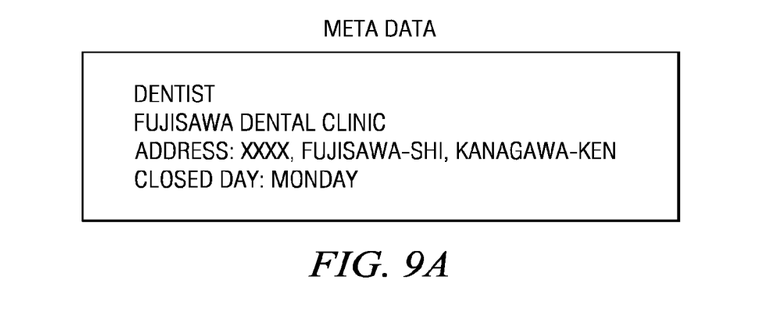
FIG. 9 is a diagram showing an example of meta data in the Web server searched in the embodiment.
Figure 9B:
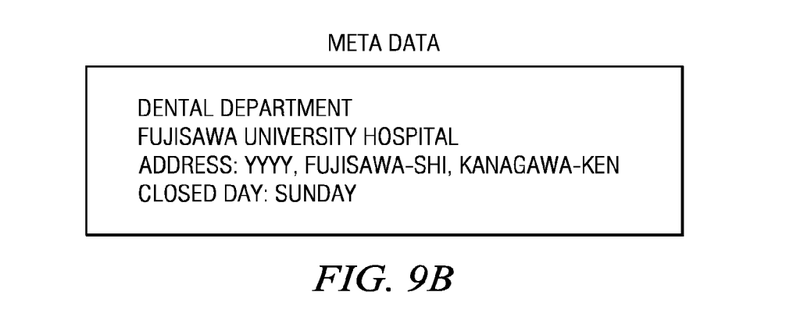

It is assumed here that two sorts of meta data shown in FIGS. 9(A) and 9(B) exist in the Web server 650 compatible with Semantic Web with respect to dental clinics available in Fujisawa. No information about closed days is described in this meta data but the relationship between open days and closed days can be known from the ontology definition obtained from the ontology server 620. From this closed day information, determination can be made as to whether or not the open days match the condition in the inquiry sentence. In this case, the dental clinic shown in FIG. 9(A) is closed on Monday, and it is understood that this clinic is open on Sunday and matches the inquiry sentence. On the other hand, the dental clinic shown in FIG. 9(B) is closed on Sunday and does not match the inquiry sentence.

Figure 10:
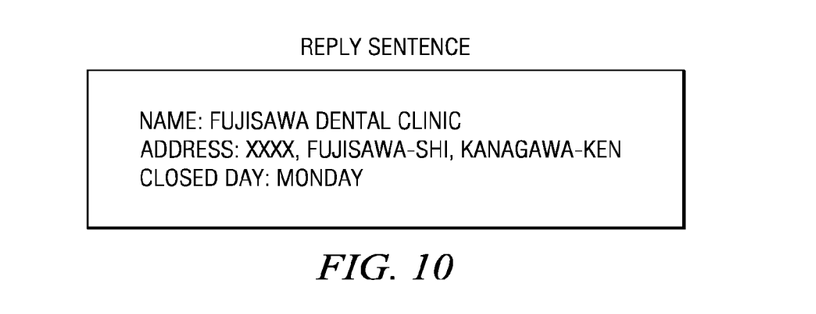
FIG. 10 is a diagram showing the contents of a reply sentence formed on the basis of the search results.

After the completion of the information search, a reply sentence is formed in OWL in the agent server 530 with respect to the search results, and the reply sentence is sent to the portal server 610 (operation 8). In this case, since a match with the dental clinic shown in FIG. 9(A) has occurred, a reply sentence having contents shown FIG. 10 is formed. At the time of formation of this reply sentence, an inquiry from the agent server 630 to the ontology server 620 is made, as is that made to the ontology server 620 at the time of formation of the inquiry sentence in the portal server 610. The ontology definitions are then referred to (operation 7).

The reply sentence sent to the portal server is transferred to the user terminal 640 to be output as search results to a display device or the like (operation 9).

According to the present invention, as described above, an information search with consideration of the meanings of information can be performed in such a manner that an input sentence described in a natural language is automatically converted into an inquiry sentence in an ontology description language and a search engine compatible with Semantic Web is used. In the configuration example shown in FIG. 6, the portal server 610, the ontology server 620 and the agent server 630 are constructed as separate system each connected via a network. Needless to say, they can be implemented as information search supporting functions, ontology processor functions and search engine functions in one system.

While the embodiment has been described with respect to an example of an information search in a case where a predetermined facility (dental clinic) is searched for by setting a restricted area and open days, the embodiment in which a natural language sentence is accepted as an input can be applied to various electronic application systems, commodity purchase systems using networks, ticket reservation systems, etc.

The invention claimed is:

1. An information search system comprising:
a data processor coupled to a memory and operable for executing instructions in the memory to perform steps of:
inputting a natural language sentence and generating an inquiry sentence described in an ontology description language on the basis of the results of syntactic analysis and semantic analysis on the natural language sentence; and
performing an information search by using the generated inquiry sentence and by referring to an ontology corresponding to the contents described in the inquiry sentence, wherein said performing step is performed by referring to the ontology relating to the description of said generated inquiry sentence and by setting, as a search condition, semantic information described according to the ontology;
wherein said inquiry sentence is generated by examining a property to which a predicate of said input natural language sentence corresponds and a case frame to which the natural language sentence corresponds, on the basis of a case frame ontology dictionary in which are stored information indicating to which property in an ontology does a relationship among a predicate, a subject and an object in the natural language sentence correspond, and by describing the obtained property and case frame in said ontology description language.

2. The information search system according to claim 1, wherein said generating step decomposes the natural language sentence to generate said inquiry sentence according to dependence relationships between single words of said natural language based on a case frame defined in correspondence with the ontology, and wherein said case frame describes the dependence relationships.

3. The information search system according to claim 1, wherein said ontology description language is Web Ontology Language (OWL), and wherein said performing step provides results of its search in the OWL language.

4. An information search supporting data processing system that includes a processor and memory comprising:
a morpheme analysis section which performs morpheme analysis on a natural language sentence;
a syntactic and semantic analysis section which performs syntactic analysis on the natural language sentence processed by said morpheme analysis section and further performs semantic analysis on the natural language sentence; and
a conversion execution section which converts the natural language sentence processed by said syntactic and semantic analysis section into an inquiry sentence described in an ontology description language to be provided to a search engine by referring to a case frame ontology dictionary in which are stored information indicating to which property in an ontology does a relationship among a predicate, a subject and an object in the natural language sentence correspond;
wherein said conversion execution section generates said inquiry sentence by examining, on the basis of said case frame ontology dictionary, a property to which a predicate of said natural language sentence processed by said syntactic and semantic analysis section corresponds and a case frame to which the natural language sentence corresponds and by describing the obtained property and case frame in said ontology description language.

5. The information search supporting data processing system according to claim 4, wherein said syntactic and semantic analysis section decomposes the natural language sentence according to dependence relationships between single words of said natural language sentence based on a case frame defined in correspondence with the ontology.

6. The information search supporting data processing system according to claim 4, wherein said syntactic and semantic analysis section decomposes the natural language sentence on the basis of a relationship among a predicate included in said natural language sentence, a nominative case related to the predicate, and an objective case which is a word acting on the nominative case.

7. The information search supporting data processing system according to claim 4, further comprising:
a storage device in which an ontology definition set is stored; and
an ontology processor which accesses said storage device and searches for the definition in the ontology corresponding to the structure of the natural language sentence,
wherein said conversion execution section generates said inquiry sentence by calling up said ontology processor and referring to the definitions in the ontology related to words included in said natural language sentence processed by said syntactic and semantic analysis section.

8. A computer readable storage medium encoded with a computer program that is operable with a data processing system for causing the data processing system to execute:
first processing for inputting a natural language sentence and performing morpheme analysis on the natural language sentence;
second processing for performing syntactic analysis on the natural language sentence after morpheme analysis and further performing semantic analysis on the natural language sentence; and
third processing for converting the natural language sentence after syntactic analysis and semantic analysis into an inquiry sentence described in an ontology description language by referring to a case frame ontology dictionary in which are stored information indicating to which property in an ontology does a relationship among a predicate, a subject and an object in the natural language sentence correspond, wherein said third processing includes:
processing for examining, on the basis of said case frame ontology dictionary, a property to which a predicate of said natural language sentence processed by the syntactic analysis and the semantic analysis corresponds and a case frame to which the natural language sentence corresponds; and
processing for generating said inquiry sentence by describing the obtained property and case frame in said ontology description language.

9. The computer readable storage medium encoded with the computer program according to claim 8, wherein, in said second processing, the computer is made to execute processing for decomposing the natural language sentence according to dependence relationships between single words of said natural language sentence based on a case frame defined in correspondence with the ontology.

10. The computer readable storage medium encoded with the computer program according to claim 8, wherein, in said second processing, said computer is made to execute processing for decomposing the natural language sentence on the basis of relationships among a predicate included in said natural language sentence, a nominative case related to the predicate, and an objective case which is a word acting on the nominative case.

* * * * *